June 6, 1961 L. G. ABYSALH 2,987,585

TELEPHONE BRACKET

Filed April 8, 1959

LOUIE G. ABYSALH
INVENTOR.

BY [signature]
ATTORNEY

United States Patent Office 2,987,585

Patented June 6, 1961

2,987,585

TELEPHONE BRACKET

Louis G. Abysalh, Worcester, Mass.

Filed Apr. 8, 1959, Ser. No. 804,961

3 Claims. (Cl. 179—146)

This invention relates to a telephone bracket and more particularly to apparatus arranged to hold the hand set of a wall telephone when the hand set is removed from the hook.

In using a wall telephone, it is often necessary to leave the telephone while calling another person to receive a call. The hand set cannot be placed on the telephone hook, of course, because this would break the connection. The usual practice in the past, then, was to permit the hand set to dangle by its cord. This brought about rapid wear of the connection between the cord and the telephone box and often the hand set would swing and strike against the wall in a manner which made the life of the hand set very short. Furthermore, when the person called to the phone arrived it was necessary for him to retrieve the hand set from a low position. Furthermore, when the wall phone was mounted in a low position, as beside a desk, the hand set when lowered on the cord would strike the floor and would be left laying there. The appearance of the hand set hanging from its cord or lying on the floor was untidy, to say the least. These and other difficulties experienced with the prior art devices have been obviated in a novel manner by the present invention.

It is, therefore, an outstanding object of the present invention to provide a telephone bracket for use with a wall phone which will support the hand set in a novel manner when the hand set is removed from the hook.

Another object of the invention is the provision of a bracket for use with the hand set of a wall telephone which has a novel manner of attachment to the telephone body.

It is a still further object of this invention to provide a telephone bracket for holding a hand set of the telephone in a safe place so that it will not be subject to injury or to cause injury to the cord.

Another object of the instant invention is the provision of a telephone bracket of neat appearance which is simple and inexpensive to manufacture and which can be subjected to considerable abuse without damage.

A further object of the invention is the provision of a telephone bracket which may be readily mounted or removed from the body of a wall telephone.

With these and other objects in view as will be apparent to those skilled in the art, the invention resides in the combination of parts set forth in the specification and covered by the claims appended thereto.

The character of the invention, however, may be best understood by reference to certain of its structural forms, as illustrated by the accompanying drawings which:

Like reference characters denote similar parts in the several figures of the drawings.

Figure 3:
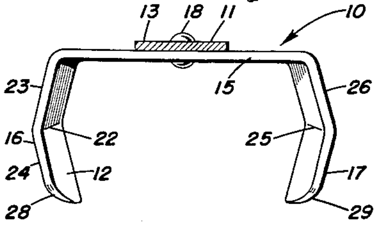
FIG. 3 is a sectional view taken on the line III—III of FIG. 2.
Figure 2:
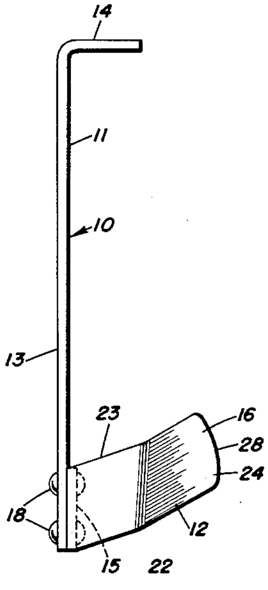
FIG. 2 is a side elevational view of the telephone bracket.
Figure 1:
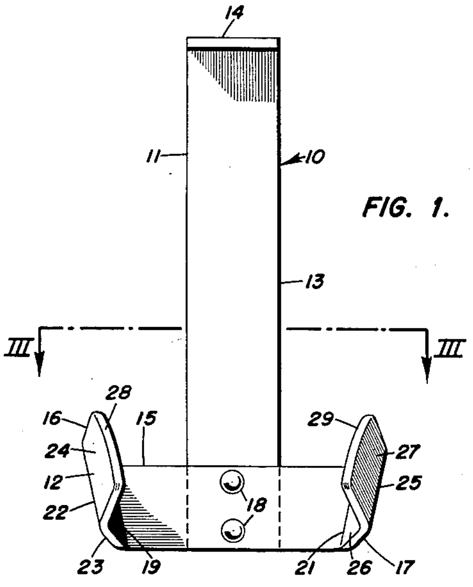
FIG. 1 is a front elevational view of a telephone bracket embodying the principles of the present invention.

Referring first to FIGS. 1, 2, and 3, wherein are best shown the general features of the invention, it can be seen that the telephone bracket, indicated generally by the reference numeral 10, consists of a suspension member 11 and a cradle member 12. The suspension member 11 consists of an integral elongated strip of sheet metal bent at a right angle to form a long main body portion 13 and a short tongue portion 14 extending at right angles to one end of the body portion.

The cradle member is also integrally formed of sheet metal and consists of an elongated strip of sheet metal bent to form an elongated main body portion 15 and two arms 16 and 17. The central part of the main body portion 15 is fastened by rivets 18 or the like to the end of the suspension member 11 opposite the tongue 14. The main body portion 15 of the cradle member and the main body portion 13 of the suspension member form an inverted T-shape. The arms 16 and 17 are bent forwardly of the main body portion 15 of the cradle member along inclined fold lines 19 and 21 respectively. These fold lines incline inwardly in the downward direction to define the main body portion 15 as an inverted trapezoid, i.e., a trapezoid in which the broader base is at the top. The arm 16 is bent along a fold line 22 to divide it into an inner portion 23 and an outer portion 24. The inner portion 24 extends at an angle to the plane of the main body portion 15 which is well outside of an imaginary plane which would pass through the fold line 19 at a right angle to the plane of the main body portion 15. In the same way, the outer portion 24 of the arm 16 extends in a plane inwardly of an imaginary plane extending at right angles to the plane of the main body portion 15 through the fold line 22. In the same way the arm 17 is divided by a fold line 25 into an inner portion 26 and an outer portion 27; the inner portion 26 extending in a plane which is outwardly and at a substantial angle to an imaginary plane passing through the fold line 21 at a right angle to the plane of the main body portion 15 while the outer portion 27 extends inwardly in a plane which is at a substantial angle to a plane passing through the fold line 25 and perpendicular to the plane of the main body portion 15. The result is, as best evidenced in FIG. 3, that the inner portions 23 and 26 extend outwardly away from one another while the outer portions 24 and 27 extend inwardly and toward one another. As is evident in FIG. 2, the outer ends of the arms 16 and 17 are provided with curved edges 28 and 29, respectively.

Figure 4:
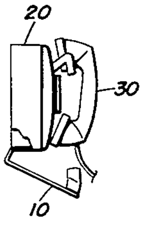
FIGS. 4, 5 and 6 are side views showing various steps in the use of the invention.
Figure 5:
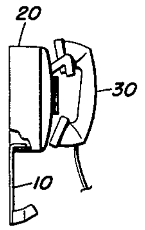
Figure 6:
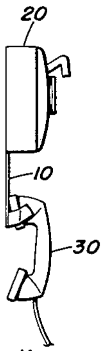

The operation of the apparatus of the invention will now be readily understood in view of the above description. Referring to FIGS. 4, 5 and 6 it can be seen that the bracket 10 is adapted to be used in conjunction with a wall-type telephone 20 having a hand set 30. In order to mount the bracket 10 on the wall set 20 it is necessary to make use of the fact that, when the wall set is mounted on a wall, there is usually a small gap between the wall and the back edge of the box-like wall set. The tongue 14 is inserted in this crack in somewhat the manner shown in FIG. 4. The tongue is pushed vertically up behind the telephone box vertically until it has gone as far as it can go. When the main body portion 11 of the suspension member is rotated about the lower edge of the box until it lies vertically against the wall in the manner shown in FIG. 5. At that time the tongue 14 lies on top of the bottom wall of the telephone box and the bracket is held in place, first of all, by the weight of the bracket itself on the tongue 14 and, secondly, by the natural resilience of the telephone box pressing against the wall. The telephone bracket is then in position for use. When a person answers the telephone he must remove the hand set 30 from its hook and, if it is necessary for him to leave the telephone, he cannot place the hand set on the hook, otherwise the connection will be cut off. In the past it has been the usual practice to hang the hand set by its cord, but, as has been stated above, there are many reasons why this is not desirable. With the use of the present bracket 10 it is only necessary to place the hand set in the bracket 10 in the manner indicated in FIG. 6. At that time, the cradle member 12 embraces one end of the hand set, preferably the receiving end, as distinguished from the speaking end, so that the cord is permitted to drape neatly beside the telephone.

It can be seen that the bracket 10 is readily removed by reversing the steps shown in FIGS. 4 and 5. It is inconspicuous in appearance and protects the telephone hand set from injury. It is not necessary to mar the wall adjacent the wall telephone to fasten the bracket in place.

It is obvious that minor changes may be made in the form and construction of the invention without departing from the material spirit thereof. It is not, however, desired to confine the invention to the exact form herein shown and described, but it is desired to include all such as properly come within the scope claimed.

Invention having been thus described, what is claimed as new and desired to secure by Letters Patent is:

1. A telephone bracket, comprising a vertical suspension member, a cradle member fastened to one end of the suspension member, a tongue extending laterally from the other end of the suspension member, arms extending laterally from the opposite ends of a main body of the cradle member, each arm having an inner portion adjacent the said main body and an outer member adjacent the inner portion, the inner portions being bent slightly upwardly and outwardly away from one another while the outer portions are bent inwardly toward one another.

2. A telephone bracket, comprising an elongated vertical suspension member formed of sheet material, an elongated cradle member formed of sheet material fastened to one end of the suspension member to form an inverted T, a tongue extending laterally from the other end of the suspension member, arms extending laterally in the same direction as the tongue from the opposite ends of a main body of the cradle member, each arm having an inner portion adjacent the said main body and an outer portion extending from the inner portion, the said inner portions being bent slightly upwardly and outwardly away from one another while the outer portions are bent inwardly toward one another.

3. A bracket for a telephone having a hand set, comprising a vertical suspension member, a cradle member fastened to one end of the suspension member and extending forwardly thereof, a tongue also extending forwardly from the other end of the suspension member, arms extending laterally from the opposite ends of a main body of the cradle member, the arms being bent forwardly and inwardly toward one another to embrace the hand set when it is inserted therebetween.

References Cited in the file of this patent

UNITED STATES PATENTS

| | | |
|---|---|---|
| 1,803,817 | Tremellen | May 5, 1931 |
| 2,693,509 | Selee | Nov. 2, 1954 |
| 2,732,438 | Mansell | Jan. 24, 1956 |
| 2,878,324 | Guerrero | Mar. 17, 1959 |